INVENTORS.
JAMES P. HART
MARTIN L. KLEIN
HARRY C. MORGAN
RICHARD B. RUSH
BY Allan Rothenberg
ATTORNEY July 7, 1964  J. P. HART ETAL  3,140,469
SPANNING MONITOR Filed March 21, 1958  8 Sheets-Sheet 2

INVENTORS.
JAMES P. HART
MARTIN L. KLEIN
HARRY C. MORGAN
BY  RICHARD B. RUSH

Allan Rothenberg
ATTORNEY

July 7, 1964   J. P. HART ETAL   3,140,469
SPANNING MONITOR
Filed March 21, 1958   8 Sheets-Sheet 3

INVENTORS.
JAMES P. HART
MARTIN L. KLEIN
HARRY C. MORGAN
BY  RICHARD B. RUSH

Allan Rottenberg
ATTORNEY

INVENTORS.
JAMES P. HART
MARTIN L. KLEIN
HARRY C. MORGAN
RICHARD B. RUSH
BY Allan Rothenburg
ATTORNEY July 7, 1964

J. P. HART ETAL 3,140,469

SPANNING MONITOR

Filed March 21, 1958

INVENTORS.
JAMES P. HART
MARTIN L. KLEIN
HARRY C. MORGAN
RICHARD B. RUSH

BY Allan Rothenberg

ATTORNEY

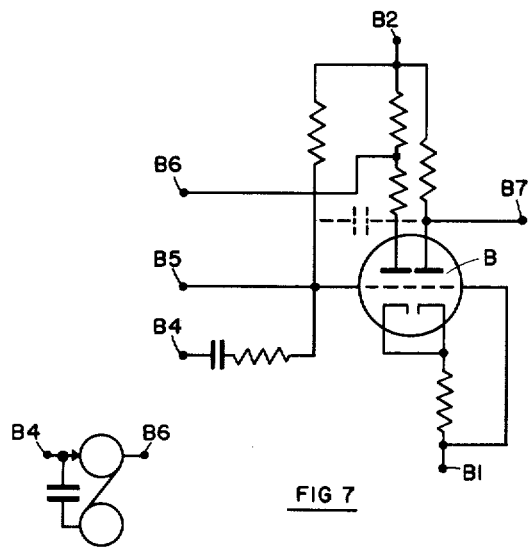
FIG 7
FIG. 7A
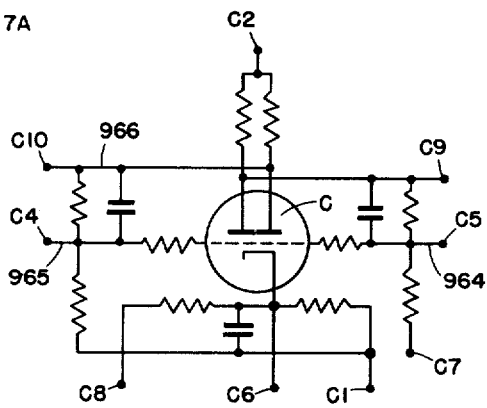
FIG. 8

July 7, 1964  J. P. HART ETAL  3,140,469
SPANNING MONITOR

Filed March 21, 1958  8 Sheets-Sheet 8

INVENTORS.
JAMES P. HART
MARTIN L. KLEIN
HARRY C. MORGAN
BY RICHARD B. RUSH

Allan Rothenberg
ATTORNEY

United States Patent Office 3,140,469
Patented July 7, 1964

3,140,469
SPANNING MONITOR
James P. Hart, San Fernando, Martin L. Klein, Woodland Hills, Harry C. Morgan, Sherman Oaks, and Richard B. Rush, Granada Hills, Calif., assignors to North American Aviation, Inc.
Filed Mar. 21, 1958, Ser. No. 723,053
13 Claims. (Cl. 340—172.5)

This application is related to the system described in copending application Serial No. 653,455, filed April 17, 1957, of Martin L. Klein, Harry C. Morgan and Richard B. Rush.

The invention relates to data processing systems and concerns particularly the presentation of the numerical value of selected data being processed for use in computers.

In making computations of performance or predicted behavior of various kinds of apparatus such as heat engines, rocket motors or the like, information is utilized such as temperatures, pressures and the like constituting operating characteristics of the apparatus. The information is ordinarily most readily obtained in the form of low level analog signals. For the computations, digital, preferably binary computers, are most practical in order to perform the large number of operations required taking into consideration the number of different parameters to be considered.

Accordingly, data processing apparatus is provided, as described in the aforesaid copending application, for converting analog quantities into binary digital signals of suitable form for use in the type of computer to be employed.

Nevertheless, as a check on the performance of the analog transducers supplying the analog information, and for other purposes, it is desirable for the operator or engineer to be able to select specific information and present it in immediately intelligible form perceptive to the human senses such as visually in decimal display without interrupting or interfering with the processing of the data, which takes place very rapidly.

Accordingly, it is an object of the invention to present a visual indication of the decimal value of data which has been converted in binary or other form which is not readily interpreted or recognized by one accustomed to decimal members.

A further object is to permit quick and convenient selection of the information to be presented.

A further object is retention of presented information sufficiently long for visual observation or otherwise sensing by a human being.

Still another object is provision for change of the visual presentation as the value of the measured quantity changes.

Other and further objects, features and advantages of the invention will become apparent as the description proceeds.

In carrying out the invention in accordance with a preferred form thereof, in conjunction with an electronic type of multiplexer, a master timer and an analog-to-digital converter with a logical circuit such as described in the aforesaid application, a decimal counter is provided with means for selecting a channel from the multiplexer in which the desired data appears and advancing the decimal counter to correspond to the value of the data in the selected channel. For selection of the multiplexer channel, dial switch means are provided. A digital counter comprising binary storage devices is provided for reproducing or temporarily storing a complement of the number in the logical circuit. Means responsive to appearance of data in the desired multiplexer channel are utilized to advance the counters until the digital counter is filled and the decimal value is displayed.

A better understanding of the invention will be afforded by the following detailed description considered in conjunction with the accompanying drawings, in which FIG. 1 is a block diagram of a spanning monitor constituting an embodiment of the invention;

FIG. 7 is a circut diagram of a delay unit employed in the apparatus of FIG. 1;

FIG. 7a is a symbolic showing of the circuit of FIG. 7.

FIG. 8 is a circuit diagram of bistable devices utilized in the apparatus of FIG. 1;

Like reference characters are utilized throughout the drawings to designate like parts.

Figure 3:
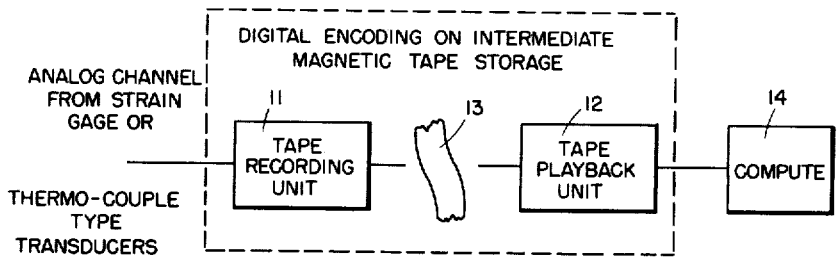
FIG. 3 is a block diagram of a data processing system of the type in which the apparatus of FIGS. 1 and 2 may be employed.
Figure 4:
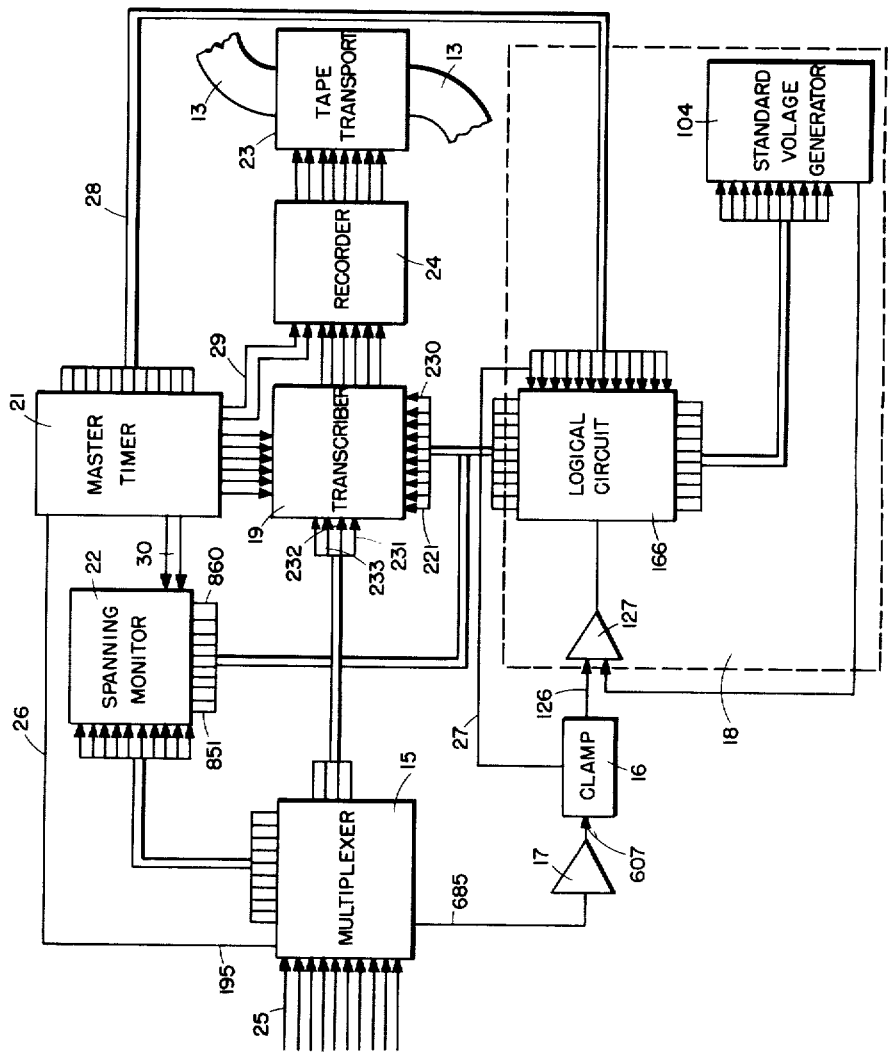
FIG. 4 is a block diagram of the tape recording unit of the apparatus of FIG. 3, illustrating the arrangement of the spanning monitor of FIG. 1 in relation to other elements in a tape recording unit of a data processing system.

In order to illustrate the purpose and function of the spanning monitor, the correlation of parts employed in a system which may utilize such a spanning monitor is illustrated in FIGS. 3 and 4. There is a tape recording unit 11 for producing records in a tape 13 representing digital values in binary form of analog measurements such as from a strain gage or a thermocouple transducer, for example. In such a system as described in the aforesaid application, tape playback unit 12 is provided for supplying the record from the intermediate tape 13 to the computer means 14 for which the data has been processed.

The elements of the tape recording unit 11, illustrated schematically in FIG. 4, comprises a multiplexer 15 supplying analog signals from a plurality of channels 25 to a clamp 16 through an amplifier 17 via leads 685 and 607. There is an analog-to-digtal converter 18 interposed between the clamp 16 and a tape code transcriber 19 and coupled via lead 126 and leads including those identified as 221, 230. There is a master timer 21 timing and synchronizing the operation of the multiplexer 15, clamp 16, analog-to-digital converter 18, and the tape code transcriber 19. To enable the operator at the recording station to observe the operation, a spanning monitor 22 is provided having connections to converter 18 including leads identified as 851, 860. A tape handler or transport 23 is provided for converting electrical output of the tape code transcriber 19 into suitable magnetic impulses for recording the digital code upon the intermediate magnetic impulse tape 13. A recorder, represented for example as an eight-channel recorder 24, is interposed between the tape code transcriber 19 and the tape handler 23. The arrangement permits physically locating the equipment necessary to produce the intermediate tape close to the test being recorded whereby the computer apparatus 14 may be located elsewhere.

In the schematic diagram of FIG. 4, a plurality of input channels entering the multiplexer 15 are represented by arrows 25 for simplicity. Likewise, for simplicity, synchronizing channels are represented by lines or by cables terminating in the lines. There are synchronizing channels 26 (including lead 195), 27, 28, 29 and 30, from the master timer 21 to the multiplexer 15, the clamp 16, the analog-to-digital converter 18, the tape code transcriber 19 and recorder 24, and the spanning monitor 22 respectively. The transcriber 19 is fed with channel identification information via leads 231, 232, 233 and with digital information via leads 221, 230.

The amplifier 17 may be of conventional form and, therefore, is not described in detail herein. The clamp 16 is a suitable type of electronic clamp for accomplishing the momentary holding of continuously varying analog signals in each of a plurality of different channels in succession to produce a momentary voltage reference used during operation by the analog-to-digital converter 18. The manner of operation of the clamp 16 for two channels is illustrated in FIG. 4 of the aforesaid application.

Figure 6:
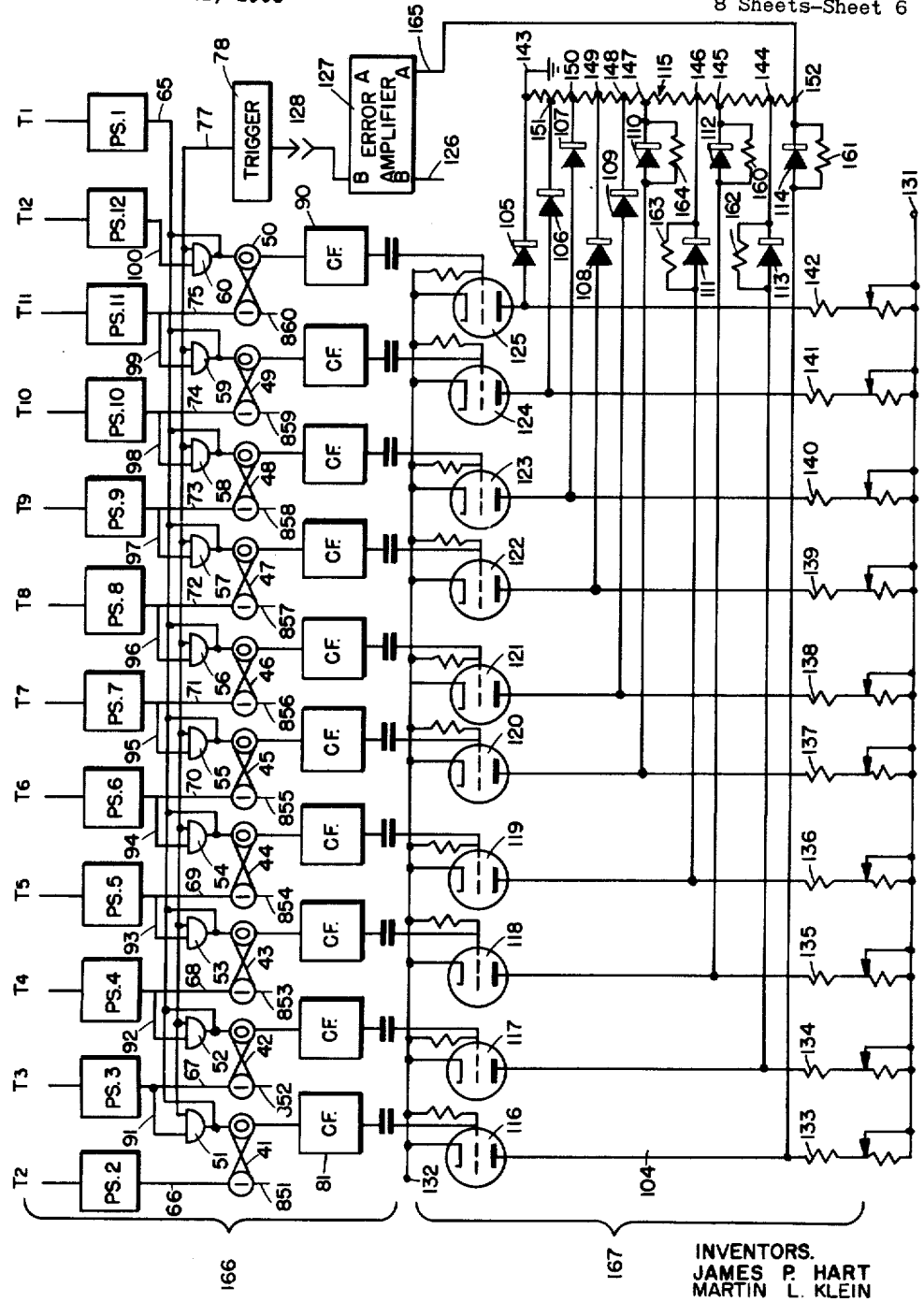
FIG. 6 is a circuit diagram, partially in block form, of an analog-to-digital converter utilized in the combination of FIG. 4.

The arrangement and conditions of the analog-to-digital converter 18 are illustrated in FIG. 6. The circuit details and principle of operation are described more fully in the aforesaid application. Briefly, the converter employed is of the electronic type employing an error amplifier 127 for comparing the voltage output of the clamp 16 with the output of a standard voltage generator 104 having a stepped output to produce digital code signals corresponding to the succesive comparison operations required until equality is reached between clamp voltage and a fractional output of the standard voltage generator.

The apparatus of FIG. 6 is illustrated as designated for use in a system where the timer 21 produces 12 consecutive square pulses for each conversion cycle in separate channels represented by numerals T1–12 in FIG. 6. For each of the timer channels T1 to T12, there is a pulse shaper designated by reference numerals PS.1 to PS.12, respectively. The pulse shapers perform the logical switching of bistable multivibrator or electronic valve circuits or flip-flop units designated by numerals 41 to 50 inclusive via leads 66 through 75. The states of the bistable units 41 to 50 represent in binary digital from accordingly, the numerical value of an analog quantity which has been converted. This value in digital form is converted to analog form by the digital to analog converter 167 which includes voltage generator 104. The voltages upon the "zero" tubes of the bistable units represent the digital value for comparison in the manner described in the aforesaid application with the stepped voltages in the standard voltage generator to produce the digital output.

The flip-flops or bistable devices 41 through 50 have output connections from the "zero" sides thereof through cathode followers 81 through 90 inclusive to gates or electronics valves 116 through 125 having anode resistors 133 to 142 connecting to plate supply 131. The standard voltage generator includes a fractional voltage summing resistance 115 having intermediate taps 143 through 152 thereof coupled to the gate valves 116 through 125 through diodes 105 through 114. The higher stage diodes 110 through 114 may be by-passed by compensating resistors 164, 163, 160, 162 and 161. The individual gating tubes 116 through 125 together with the resistor 15 effect a digital to analog conversion of the number digitally stored in the bistable devices 41 through 50. Thus, the analog value of the digitally stored number as represented by those of gates 116 through 125 which are open, is the voltage summation signal appearing at terminal 152 from whence it is fed via lead 165 to amplifier 127 for comparison with the analog input on line 126 from the clamp 16. If the signal on lead 165 is greater than that of 126 the output of the error amplifier is fed through closed disconnectable lead 128 to trigger circuit 78 which provides a trigger on line 77 which is fed to all of coincidence or "and" gates 51 through 60. The second input to these coincidence gates is supplied from pulse shapers PS.3 through PS.12 inclusive by leads 91 through 100 respectively. Upon coincidence of a signal to both input leads of the gates 51 through 60, a reset pulse is applied to each of the bistable devices 41 through 50 respectively which are also reset by a pulse on line 65 from PS.1 in accordance with the timing pulse T1. The timing pulse T1 thus resets all of the bistable devices 41 through 50 to zero the digital count thereof. The next pulse, T2, applied via PS.2 and lead 66 to flip-flop 41 provides a pulse on the gating valve 116 which has its cathode coupled to a suitable source of negative potential at terminal 132 to open this gate and thus establish at terminal 152 of summing resistor 115 an analog voltage indicative of the digital value assigned to the highest order flip-flop 41. The next timing pulse, T3, similarly applies through PS.3 and lead 67 a setting pulse to flip-flop 42 which opens gate 117 to effectively add to the voltage established at terminal 152 an analog signal indicative of the lesser (by one-half) digital value assigned to flip-flop 42. If the voltage established at point 152 by the opening of gate 116 is greater than the analog signal on lead 126, gate 116 will be closed upon the application of timing pulse T3 to thus subtract the analog of the value assigned to flip-flop 41. If the analog signal upon lead 165 (point 152) effected by the opening of gate 116 by pulse T2 was greater than the analog signal on lead 126, the error amplifier 127 actuates the trigger 78 to establish one input to the coincidence gate 51. Thus, upon the occurrence of pulse T3 the second input to gate 51 is also established to effect resetting of flip-flop 41 and closing gate 116. If the analog voltage produced by gate 116 was not greater than the analog input on line 126, trigger 78 is not actuated and thus flip-flop 41 remains on and gate 116 remains open during the pulse time T3 and successive pulse times. This operation continues through and including the pulse T12 from the master timer at which time the analog-to-digital conversion is completed and the flip-flops 41–50 digitally store the analog signal on line 126.

Since the "zero" tube voltages of units 41 to 50 represent bits of a binary number, the voltages upon the opposite tubes, in this case the "one" tube, of the bistable devices represent the radix-minus-one complement as will be more particularly described hereinafter. For use in the spanning monitor 22, voltage connections 851 to 860, inclusive, are taken from the "one" tubes instead of the "zero" tubes of the bistable units 41 to 50.

Preferably, a cascaded type of multiplexer is employed in which for presenting analog signals from one hundred different transducers, for example, a ring of ten circuits is employed to represent units in the location number and another ring of ten is used to represent tens in the location number so that the complete number representing the location of the input channel for identifying the channel may be obtained from voltages appearing in the location indicating output terminals of the electronic multiplexer circuits.

Figure 5:
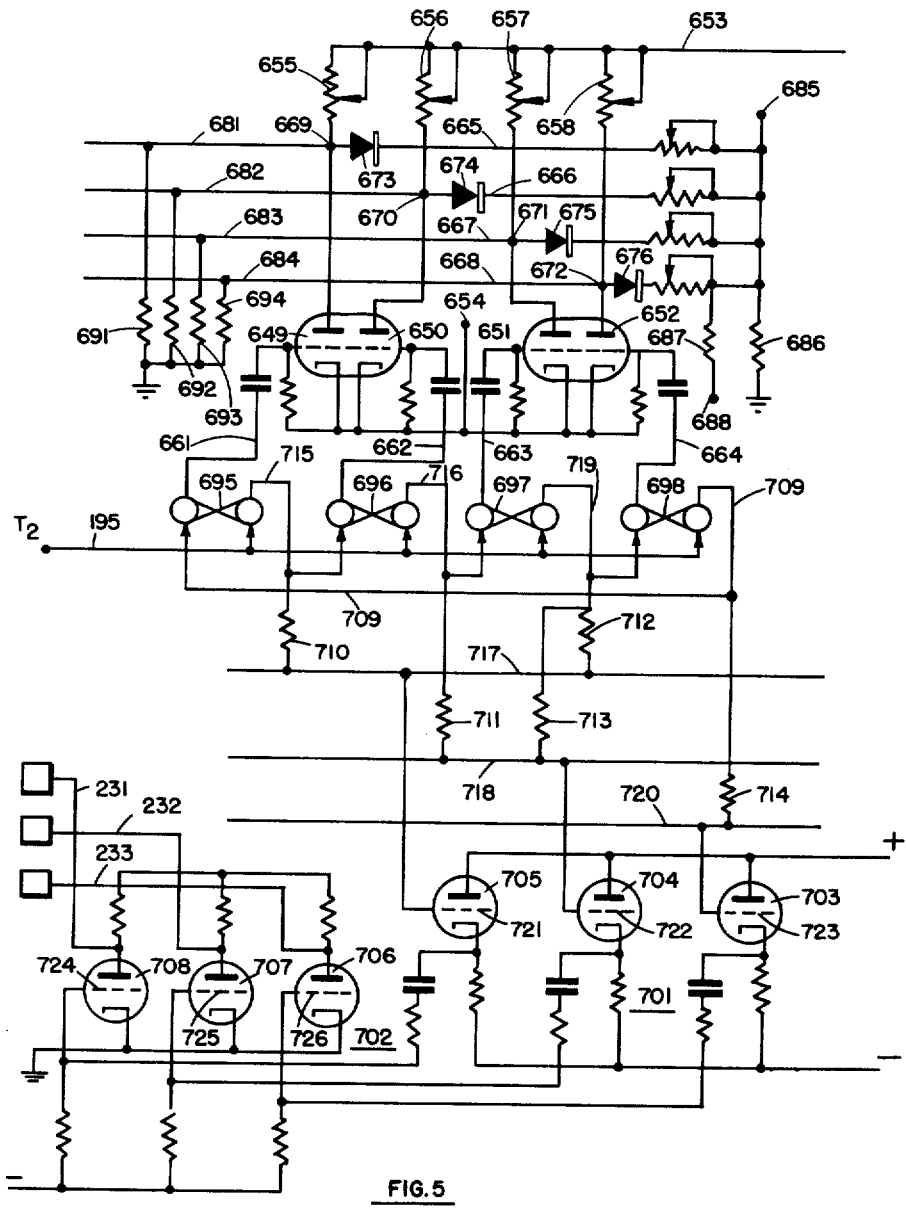
FIG. 5 is a circuit diagram of an electronic multiplexer illustrative of the principle of operation of the multiplexer shown in FIG. 4 as simplified in the number of circuits to simplify the drawing.

The multiplexer 15 may be of the diode switch type such as is illustrated, for example, in FIG. 5. For simplicity, only one ring instead of separate rings for each order of the location numbers are illustrated and only sufficient circuit elements are shown in FIG. 5 for four channels although ten-channel or ring of ten circuits may be employed for each order of the actual multiplexer. The principle of operation will be apparent from the explanation of the four channel operation of one order. The multiplexer, as shown, comprises a plurality of thermionic valve units such as triodes 649, 650, 651 and 652 controlling four channels by means of a matrix of silicon diodes. Preferably, diodes of the 1N214 type are employed. The triodes 649–652 are energized by means of a power supply having a positive terminal 653 and a negative terminal 654, adjustable anode resistors 655, 656, 657 and 658 being interposed between the positive terminal 653 and the anodes of the triodes 649–652. The triodes 649–652 have control electrodes capacitatively coupled to control terminals 661, 662, 663 and 664, respectively, which are connected through bistable valve circuits or flip-flops 695–698 to a suitable output terminal such as T2 of the master timer 21 at which appears successive negative pulses. The master timer 21 may comprise a ring counter of the type described, for example, in "High Speed Computing Devices," 1950, by Engineering Research Associates, pages 23–25, and illustrated in FIGS. 3–7 thereof, or described in "Electron Tube Circuits," by Samuel Seely, 1950, pages 422–424, and illustrated in FIGS. 19–20 thereof. Preferably, however, a circuit as illustrated in FIG. 24 of the aforesaid application is employed.

The diode matrix of FIG. 5 includes a lattice formed by plurality of transverse conductors 665, 666, 667 and 668, each having a connection to a different one of the anode leads of the triodes 649–652 so that the connections serve as anode terminals 669, 670, 671 and 672. Semiconductor diodes 673, 674, 675 and 676 are provided which are so connected in series with conductors 665, 666, 667 and 668, respectively, that the triode anode terminals 669–672 serve also as anode terminals for the diodes 673–676.

Input terminals 681, 682, 683 and 684 (leads 25 of FIG. 4), to which the different analog signals are simultaneously supplied, are connected to the conductors 665–668 at the anode ends of the diodes 673–676. The opposite ends of the conductors 665–668 are connected to an output terminal 685, which is grounded through a resistor 686 and negatively biased through a resistor 687 connected to a negative bias supply terminal 688 which may be common to the terminal 654. The analog signal input terminals 681–684 are also grounded through separate bleeding resistors 691–694.

The apparatus is arranged for a channel identification code to be produced by the multiplexer 15 illustrated in FIGS. 4 and 5 and supplied to the transcriber 19 through leads 231, 232, 233 as well as to the spanning monitor 22 through lead 715, 716, 719, 709. For location readout in binary code, the timing pulses for excitation of the control terminals 661, 662, 663 and 664 are supplied through bistable valve circuits 695, 696, 697 and 698 and a logical resistor matrix consisting of resistors 710 to 714 and are read out through cathode followers 701 followed by amplifiers 702. The counter represented by the four bistable valve circuits 695 through 698 is, as shown, a counter modulo 4 which may actually be a counter modulo 10 with the addition of the appropriate number of additional bistable valve units as described on page 23 and FIGS. 3–7 of the above mentioned "High Speed Computing Devices." Such a counter may count one, two or more orders of radix 10 by the provision of one modulo 10 ring for each order. Thus, for counting up to 100 decimally, there will be two of the decade counters of the type partially illustrated by the bistable circuits 695 through 698 having the feedback on line 709 from the last stage to the first. Thus, for each pulse T2 supplied to the "1's" order decade counter a different one of the control terminals 661 through 664 is excited and a different one of the analog inputs on lines 681 through 684 will appear at the multiplexer output terminal 685. For reading the decimal number counted by the decade counter 695 through 698 in binary form, the decade counter outputs are combined by the resistor matrix 710, 711, 712, 713 and 714 and fed to the control grids 721, 722 and 723 of cathode followers 705, 704 and 703 respectively which have the outputs thereof supplied to the control grids 724, 725 and 726 of amplifying triodes 708, 707 and 706. The outputs of these amplifiers 702 are fed to the binary readout circuit terminals 231, 232 and 233 for purposes more particularly described in the above mentioned copending application. It is to be understood, as in conventional plural order radix 10 counters, the highest count of any lower order ring of 10 circuit is fed back as by line 709 to zero the count of such lower order and simultaneously fed as an input to the next higher order ring of 10 circuit.

The reading of the bistable valve units 695–698 in decimal code for use in the spanning monitor is represented by voltages on the lines 715, 716, 719, 709. Whichever voltage is elevated in comparison with the others represents a decimal value. For example, if the potential of the line 715 is high, data location or channel number 1 is represented. Then when line 716 is high, location number 2 is represented, line 719 representing location number 3 and line 709 representing location number 4. Additional lines in a ring with the full number of ten bistable units are included to provide for representing additional decimal digits. For simplicity, only four analog signal channels have been represented in FIG. 5, and only four of the channel identification bistable valve units have been represented in FIG. 5.

In the arrangement as illustrated for simplicity in FIG. 5, each of the bistable valve units 695, 696, 697 and 698 has an input connection through a line 195 from the terminal T2 of the timer 21 thereby synchronizing the multiplexer 15 with the analog-to-digital converter 18 illustrated in FIG. 6 and effecting decimal counting of the pulses at terminal T2 for channel identification. The bistable valve circuits 695, 696, 697 and 698 are arranged in ring form, as shown by a feedback connection 709 from one of the tubes of the unit 698 back to the input terminal of one of the tubes of the unit 695. Accordingly, for each timing cycle of the master timer 21 (for each pulse T2 thereof), the ring of bistable valve circuits 695, 696, 697 and 698 is advanced one step and a different one of the analog input channels 681, 682, 683 and 684 is connected to the output terminal 685 of the multiplexer.

In operation of the multiplexer, all but one of the diodes 673–676, inclusive, is rendered inoperative by lowering its anode potential sufficiently so that it falls below ground potential and the diode becomes nonconducting. This is accomplished by the fact that the control terminals 661–664 cause the triodes 649–652 to remain conducting, thereby reducing the anode potential. However, as the negative time pulse T2 successively appears for each successive conversion cycle upon the control terminals 661–664, the triodes sequentially become nonconducting so that one of the anode terminals at a time, rises in potential and permits the corresponding diode to become conducting, thereby causing the corresponding input signal to transmit its signal to the output terminal 685.

For example, when the diodes 674, 675 and 676 are nonconducting and the diode 673 is conducting, the diode 673 is biased by the passage of current through the anode resistor 655, the diode 673, the conductor 665 and the resistor 686 to ground. The potential of the cathode of the diode 673 and therefore the potential of the output terminal 685 is determined by the potential of the input signal appearing upon the input terminal 681. Any rise or fall in the potential of the signal would cause such a differential of current through the resistors 655, 691 and 686 as to cause the potential of the output terminal 685 to correspond to the potential of the analog signal input terminal 681.

The spanning monitor of this invention fundamentally provides readout by additively advancing to zero a counter into which has been set the complement of the number to be indicated. The true complement C of a number N of radix R expressed in $n$ orders is $R^n-N$. In binary form (radix 2), for example, the number 1011 (decimal eleven) is expressed in four orders and the radix is 2. The true complement of this number may be obtained by subtracting N (binary 1011) from $R^n$ (binary 10000) to obtain $C=0101$. If the number N be added to this complement C as expressed in the four orders of this example, each of such orders will become binary 0. Thus, a series of units or binary 1's may be added to the complement until all of the orders are binary 0. The total of such added units is the number N. The zeroing of all complement orders may, therefore, be conveniently utilized to stop a counter or indicator which is arranged to count the added units and may thus be caused to indicate the number N. If the number N be stored in binary form by a plurality of bistable devices or flip-flops, as in a conventional binary counter, the true complement C may be conveniently obtained by inverting each digit of the stored number N and adding one unit thereto. Such digit inversion is inherently available from the conventional counter. It may be shown that this inversion alone yields the radix-minus-one complement $C_1=R^n-N-1$ which may thus simply be converted to the true complement C by adding one unit to obtain $R^n-N-1+1=C$.

Figure 11:
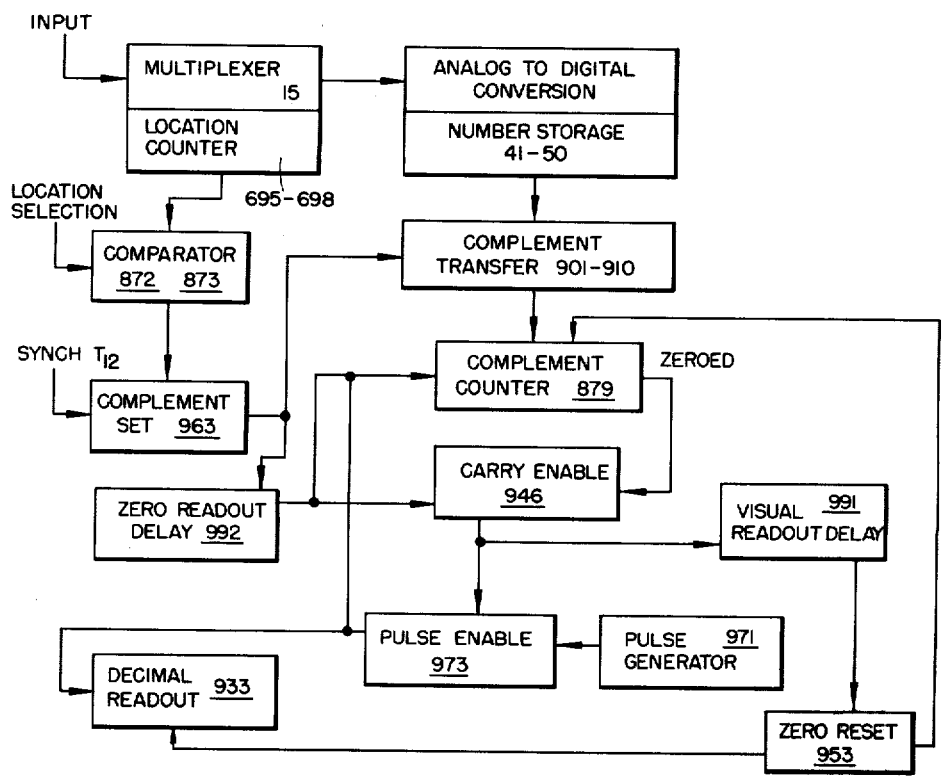
FIG. 11 is a functional diagram of the spanning monitor.

In accordance with the present invention each digit of the stored number which is desired to be indicated is inverted or reversed to obtain the radix-minus-one complement of the number. A single unit is added to the radix-minus-one complement to obtain the true complement of the stored number and then a sufficient number of units is added to this true complement until each order of the complement storage is zero. The number of such added units is indicated, as by counting in a decimal counter, to afford a decimal readout of the originally stored number. As functionally indicated in FIG. 11, a plurality of inputs is applied through multiplexer 15 under the control of location counter 695-698 to the logical circuit including number storage flip-flops 41-50. A multiplexer channel location selection is operated manually or otherwise to set into a comparator comprising switch banks 872 and 873 the location or channel of the number to be readout. The comparator is also fed with the channel information from the location counter of the multiplexer. Upon coincidence of the signal from the location counter with the selected location, a complement set device 963 is enabled so that upon the appearance of a synchronizing signal such as T12 from the master timer (after device 963 is enabled) a signal will be fed to enable complement transfer gates 901-910 whereupon the radix-minus-one complement of the number in storage 41-50 (and appearing at terminals 851-860 thereof) may be transferred to the binary complement counter 879 which has previously been zeroed by the zero reset circuitry including device 953. A decimal readout device 933, such as a conventional decimal counter, is also zeroed by reset devices 953 simultaneously with the zeroing of complement counter 879. The pulse T12 is transmitted through the enabled complement set device 963 to zero readout delay device 992 which at the end of its delay period feeds a single pulse to the complement counter 879 to effect advance thereof by one unit and thus change the radix-minus-one complement therein to the true complement. The pulse at the end of the zero readout delay time sets carry enable device 946 which prevents opening of a counting pulse enabling gate 973 for a time sufficient to allow the single pulse from delay device 992 to pass through device 879 as far as it may have to go. This may be the full length of the counter and depends on the particular number which has been set therein. At the end of the carry enable period gate 973 is enabled. The complement counter advancing pulses from the pulse generator 971 are fed through enabled gate 973 while the latter is open to the decimal readout device 933 whch counts and decimally indicates the total number of such advancing pulses and also to counter 879 to advance the latter to zero. When the complement counter 879 receives a number of pulses equal to the number of which the radix-minus-one complement had been transferred from storage 41-50, the complement counter is zeroed or filled and a signal is fed therefrom through the carry enable device 946 to device 973 whereupon the pulse from pulse generator 971 is disabled by closing of pulse enabling device 973 and no further advancing pulses can be counted. The signal from carry enabling device 946 which closes pulse enabling device 973 is also fed via visual readout delay device 991 to operate the zero reset device 953, whereby the complement counter 879 and the decimal readout counter 933 are both zeroed after a delay sufficient to enable the visual reading of the number indicated by the decimal counter 933. Upon such re-zeroing, the apparatus is again in condition to respond to the location counter-location selection-comparator and a synchronizing pulse T12 whereby the number in storage device 41-50 at this particular time will again be decimally indicated in readout device 933.

Figure 1:
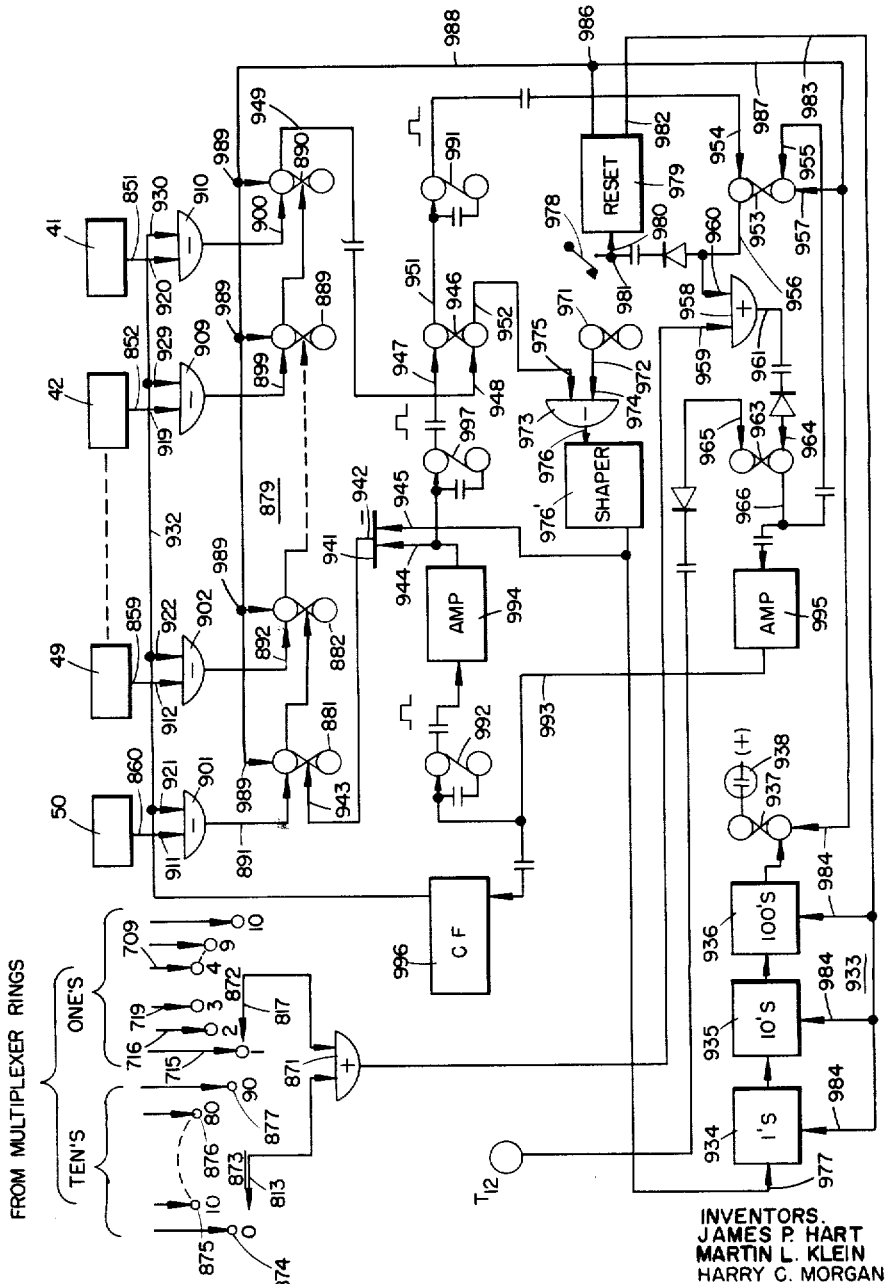

As shown in FIG. 1 the location selection of the illustrated embodiment of the spinning monitor is accomplished by a bank of dial switches. For a decimal indication of one hundred locations, there are two switches 872 and 873 in the bank. Also, it will be understood that if additional orders of the decimal location number higher than 99 are required, additional switches are provided. In the arrangement illustrated, there are ten stationary contacts 1-10 inclusive, representing ten digits of the first order (one's) of the location number, each of which is connected to terminals or lines in the unit ring of the multiplexer location counter. For example, stationary contacts 1, 2, 3 and 4 are connected to lines 715, 716, 719 and 709 respectively of the multiplexer of the type illustrated in FIG. 5. As will be understood, the switch 872 comprises a blade 817 which is adapted to be positioned manually in contact with any one of the stationary contacts 1-10 according to the location number to be selected. Likewise, for the tens order, there are stationary contacts 874, 875, etc., including contacts 876 and 877, representing 0, 10, 80 and 90, respectively, in the drawing which has been abbreviated for simplicity.

A conventional digital binary counter 879 which alternatively may be of the type shown in FIGS. 3-4, page 18 of the above mentioned "High Speed Computing Devices," is herein illustrated as comprising a plurality of bistable electronic valve units 881-890 inclusive having input lines or control terminals 891 to 900 inclusive, connected to output terminals of gates represented diagrammatically as negative "and" gates 901-910 inclusive. A negative "and" gate produces a negative output upon the simultaneous occurrence of negative signals at each input thereof. Each of the "and" gates 901-910 has a pair of input terminals. For example, there are input terminals 911 to 920 inclusive connected to the lines 860 to 851 inclusive, which are the radix-minus-one complement voltage indicating lines of the logical circuit of FIG. 6 with line 860 indicating lowest order and line 851 highest order. There are also input terminals 921-930, all of which are connected to a common line 932 serving as a complement set line. The bistable valve devices 881-890 serve as binary storage devices of the digital complement counter 879 into which the radix-minus-one complement is shifted in binary form as will be explained more fully hereinafter.

There is also a decimal counter 933 of conventional type which may be similar to the decimal location counter described in connection with FIG. 5, having counter units or ring of ten circuits 934, 935 and 936 for units, tens and hundreds orders. When numbers up to one thousand are to be counted an additional bistable valve device 937 may be cascaded with the units 934, 935 and 936 to indicate the numeral one thousand by means of a neon tube 938. It is to be understood that counter 933 is provided with suitable visual indicators (not shown) such as, for example, neon tubes. Means are provided for causing the complement value from the lines 851 to 860 to be set into the digital counter 879 and for both counters 879 and 933 to be advanced when the multiplexer reaches the location represented by the setting of the bank of dial switches 872, 873. For this purpose, there is a negative "or" gate 941 having an output terminal 942 connected to an input terminal 943 of the lowest order stage of the digital counter 879 and having input terminals 944 and 945.

It will be understood that digital counters of the type represented by the counter 879 have a small but actual carry time required for any single pulse to be added thereto by the progression of carry impulses from bistable unit 881 as far as may be required by the particular number in the counter. Such a single pulse is required to change the radix-minus-one complement to the true complement. Accordingly, there is a carry enabling bistable electronic valve device 946, having a pair of input terminals 947 and 948, the latter being capacitatively connected to an output terminal 949 of the highest order stage of the digital counter 879. The bistable device 946 also has output terminals 951 and 952. The connections of the bistable device 946, which is conventional, are such that in its switching states a negative pulse at input terminal 947 produces a negative going potential at the output terminal 952, and a negative pulse at the input terminal 948 produces a negative going potential at corresponding output terminal 951. The terminals 947, 948 have opposite potentials thereon, likewise, terminals 951 and 952.

There is a zero reset bistable device 953 having opposite input terminals 954 and 955 and having an output terminal 956 corresponding in polarity to the potential of the input terminals 955 and 957. The additional input terminal 957 serves for changing state, the input terminal 954 being connected to the output terminal 951 of the bistable device 946 through delay device 991.

There is a complement enabling "and" gate shown as an inverting "and" gate 958 having a pair of input terminals 959 and 960 and an output terminal 961, the input terminal 960 being connected to the output terminal 956 of the bistable device 953. The inverting "and" gate produce a negative output upon the simultaneous occurrence of positive inputs. Responsive to the inverting "and" gate 958 there is a complement set bistable valve device 963, having an input terminal 964 capacitatively and unidirectionally connected to the gate output terminal 961, an input opposite terminal 965, and an output terminal 966 corresponding in polarity to the input terminal 965. The output terminal 966 in turn is connected to the input terminal 944 of the negative "or" gate 941 through amplifier 995, delay device 992 and amplifier 994, and also is capacitatively connected to the input terminal 955 of the zero reset bistable device 953 in addition to being capacitatively connected to the set line 932 via amplifier 995, line 993 and cathode follower 996. An oscillator such as a free-running multi-vibrator 971 is provided for producing impulses to advance the counters 879 and 933. It has an output terminal 972. For enabling the oscillator 971 to advance the counters, an oscillator enabling negative "and" gate 973 is provided, having a pair of input terminals 974 and 975 respectively connected to the oscillator output terminal 972 and to the terminal 952 of the carry enabling bistable valve device 946. The negative "and" gate 973 also has an output terminal 976 connected through shaper 976' to the second input terminal 945 of the negative "or" gate 941 and to an input terminal 977 of the decimal counter 933.

For the purpose of initially setting the counters to zero and conditioning device 953 to enable gate 958, a manual switch 978 is provided for momentarily applying positive potential to the input terminal 980 of reset thyratron 979. The use of the switch 978 is not needed, however, after the cycle of operations has commenced. Thereafter, resetting is provided by a positive pulse appearing at terminal 956 of zero reset device 953 at the end of the delay period of delay device 991. Thyratron circuit 979 has an input control electrode terminal 980 connected to the stationary contact 981 of the manual reset switch 978 and also capacitatively and unidirectionally connected to the output terminal 956 of the zero reset bistable device 953, to which also is connected the input terminal 960 of the complement enabling reversing "and" gate 958. The thyratron controlled voltage source 979 has a low voltage output terminal 982 connected to a line 983 to reset terminals 984 of the decimal counter units 934, 935 and 936. The thyratron unit 979 may also have a higher voltage output terminal 986 for connection through lines 987 and 988 to the input terminal 957 of the zero reset bistable device 953, to reset terminals 989 of the bistable devices 881 to 890 of the counter 879 and to the reset terminal of the 1000's bistable device 937.

However, in order to avoid resetting the counters automatically to zero before the operator has had an opportunity to read the value of the decimal indication, a visual data readout delay device 991 is provided which may take the form of a "one shot" or monostable multivibrator circuit interposed between the output terminal 951 of the carry enabling bistable device 946 and the input terminal 954 of the zero reset bistable device 953. The delay device 991 may have a suitable delay time such as one second for producing a one second positive square wave capacitatively applied to the input terminal 954 of the zero reset bistable device 953.

In like manner, provision is made for retaining a zero reading in the decimal counter 933 for a visually observable period of time to enable the operator to ascertain whether the system is functioning. For this purpose, an additional one second delay device 992, similar in construction to the device 991, is interposed in line 993 between the output terminal 966 of the complement set bistable device 963 and the input terminal 944 of the "or" gate 941, which is connected also to the input terminal 947 of the carry-enabling bistable device 946 through carry delay device 997. As shown, pulse amplifiers 994 and 995 are also provided, the pulse amplifier 994 being interposed between the zero readout delay device 992 and the terminal 944 of the "or" gate 941 and the pulse amplifier 995 being interposed in the line 993. As shown, a cathode follower unit 996 may also be interposed between the line 993 and the complement set line 932. The delay device 997 is connected to the output of pulse amplifier 994 and capacitatively connected to the input terminal 947 of the carry enabling bistable device 946 in order to prevent passage of the counter advancing impulses from the oscillator 871 until enough time has elapsed for the single pulse occurring at the end of the delay of device 992 to be carried from one end to the other of the digital counter 879. Assuming a maximum carry time for such a counter of approximately 15 microseconds, when the carry due to a single additive pulse must travel through all stages, the delay device 997 may be designed to produce a positive square wave of 20 microseconds duration. At the end of such 20 microsecond delay, the counter will be in condition to receive the oscillator pulses and gate 973 is therefore enabled by the negative going pulse transferred through terminals 947 and 952 to terminal 975. Except for the electrical dimensions for determining the delay time, the device 997 may be similar in construction to delay devices 991 and 992.

Figure 2:
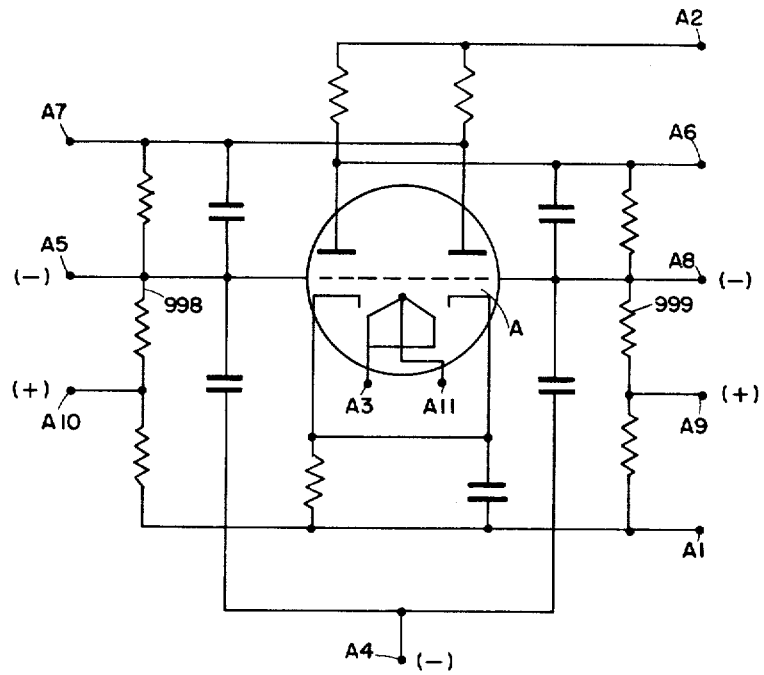
FIG. 2 is a circuit diagram of one of the bistable storage devices utilized in the apparatus of FIG. 1.

The binary storage devices 881–890, inclusive, as well as the bistable devices 937, 946 and 953, may take the form of bistable multivibrator circuits such as illustrated in FIG. 2. Each such unit comprises a twin triode electronic valve unit A, mounted in a plug-in or removable assembly with external terminals $A_1$ to $A_{11}$ inclusive. As in conventional electronic valve circuits, the unit A has anodes and cathodes for connection to a plate current supply which is connected to the external terminals $A_2$ and $A_1$. As will be understood by those skilled in the art, the grids and anodes are cross-coupled by resistance-capacity coupling circuits so that the impulse supplied to external grid terminal $A_5$ or $A_{10}$ is reproduced with opposite polarity at the external anode terminal $A_6$ and likewise an input at the external grid terminal $A_8$ or $A_9$ is reversed at the external anode terminal $A_7$. Heater terminals are indicated at $A_3$ and $A_{11}$. When switching occurs, the two allowable, but opposite, voltage levels of terminals $A_6$ and $A_7$ reverse.

Figure 2A:
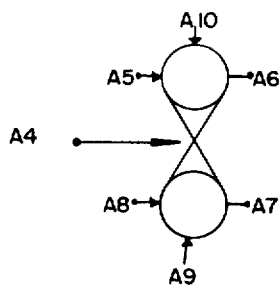
FIG. 2a is a symbolic showing of the circuit of FIG. 2.

The arrangement is such that a negative pulse applied to either of the grid terminals $A_5$ or $A_8$ causes the device to acquire a state, if it is not already in that state, in which current is cut off in the corresponding section of the twin triode unit. However, the external terminal $A_4$ is capacitatively coupled to both grids so that a negative impulse supplied thereto, shifts the state of the bistable device so that whichever triode section was previously conducting becomes non-conducting. An additional feature of the bistable unit A, illustrated in FIG. 2, is the provision of voltage dividers 998 and 999 to which additional input terminals $A_{10}$ and $A_9$ are connected so that impulses of greater voltages than would be acceptable on input terminal $A_8$ or $A_5$ may be applied to external terminals $A_9$ or $A_{10}$ respectively. For simplicity in FIG. 1, the circuitry of FIG. 2 is shown symbolically as in FIG. 2a. This flip-flop, sold by the EECO Manufacturing Company and designated as S90115, has the circuit parameters thereof so arranged that with the potential levels provided it will be sensitive solely to negative going potentials at pins $A_4$, $A_5$ and $A_8$ and sensitive to positive going potentials at pins $A_9$ and $A_{10}$. The polarities of the inputs at the several input terminals to which the flip-flop responds are as indicated in FIG. 2.

The delay units 991, 992 and 997 may take the form of monostable multivibrator units or "one-shots" such as illustrated in FIG. 7 and FIG. 7a. As illustrated in FIG. 7, such a unit comprises a twin triode electronic valve B having external terminals $B_1$ to $B_8$ inclusive. Terminals $B_3$ and $B_8$ (not shown) are heater terminals. The external terminals $B_1$ and $B_2$ are for connection to a source of plate current supply. The terminal $B_4$ is an input terminal having internal capacity for supplying input pulses to the grid of one triode section. The external terminal $B_6$ serves as an output terminal at which a negative-going impulse applied to the terminal $B_4$ is reproduced after a time delay, depending upon the electrical dimensions of the resistance and capacity circuit components, as will be understood by those skilled in the art. The unit illustrated in FIG. 7 does not constitute the applicants' present invention, being manufactured by the EECO Manufacturing Company, and described in the EECO catalogue under the designation Z8318. A further detailed description is therefore unnecessary.

As represented in FIG. 1, the delay units 991, 992 and 997 produce positive square waves in response to application of negative-going impulses so as to reproduce the negative-going voltage after a time delay corresponding to the length of the square wave.

The bistable device 963 may take the form of a plug-in unit comprising a twin triode electronic valve unit C, such as illustrated in FIG. 8, having external terminals $C_1$ to $C_{10}$, inclusive. As illustrated, the unit comprises a conventional bistable multivibrator with grids and anodes of the triode sections cross—coupled by resistance-capacity coupling circuits. The arrangement is such that a negative-going pulse supplied to the terminal 964 or plug-in terminal $C_5$, drives the anode terminal 966 or $C_{10}$ positive, whereas a negative-going pulse applied to the terminal 965 on the plug-in terminal $C_4$ drives the terminal 966 negative. The unit illustrated in FIG. 8 may be one of the type manufactured by the EECO Manufacturing Company and illustrated in the EECO Manufacturing catalogue as type Z90048.

Figure 9:
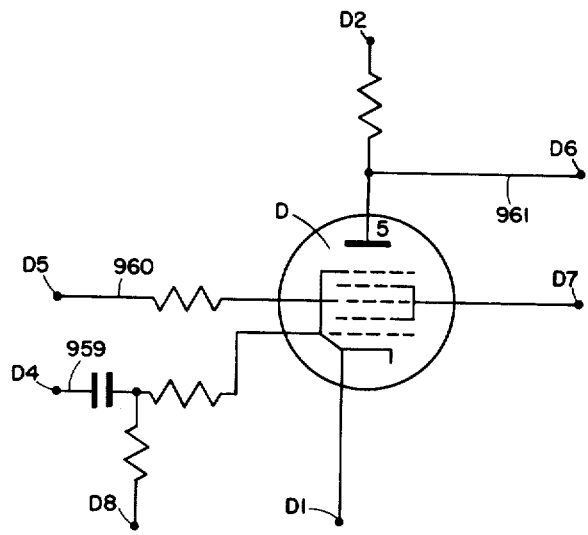
FIG. 9 is a circuit diagram of an inverting "and" gate used in the apparatus of FIG. 1.
Figure 10:
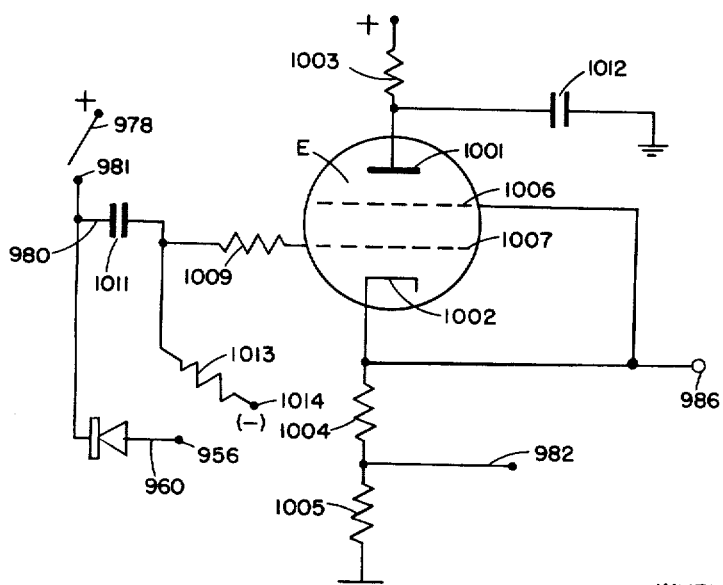
FIG. 10 is a circuit diagram of the resetting voltage source used in the apparatus of FIG. 1.

The "and" gates and "or" gates illustrated may be of the conventional type employing diodes; whereas to accomplish polarity inversion in the inverting positive "and" gate 958, an electronic valve circuit may be employed such as illustrated in FIG. 9. This may take the form of a pentagrid electronic valve unit D having external terminals $D_1$ to $D_8$, inclusive, with the plate current supply connected to the terminals $D_1$ and $D_2$ and heater supply connected to terminals not shown. The external terminal $D_6$ connected to the anode serves as an output terminal. There is a control grid capacitatively coupled to the input terminal $D_4$ and biased by a connection to ground through the terminal $D_8$. There is a number 3 grid connected through suitable current limiting resistance to the input terminal $D_5$ serving as a control input terminal 960. The characteristics of the tube D are such that a positive input supplied to one terminal $D_4$ results in a negative output at the terminal $D_6$ only when the second input terminal $D_5$ is at a potential no lower than the potential of the grounded terminal $D_1$.

The thyratron reset unit 979 may also take the form of a plug-in unit constituting a gas-filled or vapor-filled envelope E having an anode 1001 and a cathode 1002. The anode resistor 1003 is of relatively high resistance in comparison with a cathode resistor consisting of series resistors 1004 and 1005. For example, the anode resistance 1003 may be on the order of 240,000 ohms whereas the resistance of the resistors of 1004 and 1005 are on the order of 750 and 240 ohms respectively. There is a control grid 1007 coupled through current limiting resistor 1009 and a coupling condenser 1011 to the terminal 981 of the manual switch 978 and the input terminal 960 of the inverting positive "and" gate 958. The resistance of the resistor 1009 is also small, for example, of the order of 6800 ohms, in comparison with the anode resistance. Cathode 1002 is connected to number 2 grid 1006.

For supplying current to the tube E during ionization, a condenser 1012 is provided having a relatively large capacity in comparison with the other circuit parameters, for example, of the order of 0.15 microfarad. The condenser 1012 is connected between the anode 1001 and the negative terminal of the power supply or ground terminal to which the resistor 1005 is also connected. The characteristics of the tube E are such that the current required to sustain ionization can not flow through the high-resistance anode resistor. Thus ionization can occur only when current is supplied by the capacitor and the grid potential is initially high enough to initiate ionization. During the deionized state the condenser is positively charged to plate supply potential and loses this charge shortly after ionization whereby the thyratron cuts itself off.

The grid 1007 is connected through a grid leak resistor 1013 to a neagtive terminal 1014 of a negative power supply so that the grid 1007 remains negatively biased except when the zero reset bistable device 953 shifts to the state when its output terminal 956 becomes positive or switch 978 is operated. The reset switch 978 is required only when the apparatus is first put in operation. Thereafter reset pulses are derived automatically once during each complete cycle of operation which involves as many cycles of operation of the master timer 21 as there are separate signals or data channels from the multiplexer 15.

When the apparatus is first placed in operation and the manual reset switch 978 is momentarily closed, a positive voltage is applied to the terminals 981 and 980. Such a positive pulse applies a positive pulse to the grid of the thyratron unit 979 so as to produce positive voltages at the output terminals 986 and 982. Owing to the characteristics of the binary storage device illustrated in FIG. 2, the positive voltage applied over the line 988 to the terminals 989 ($A_{10}$) of each such device sets it at the state representing zero in binary code with a negative voltage at output terminal 949 ($A_6$) of the highest counter stage (and, of course, at each corresponding output terminal of the other stages). The positive pulse over the line 987 applied to the bistable 1000's indicating unit 937, also causes relatively positive voltages to appear on both electrodes of the neon tube 938 so that there is no potential difference across it, and it is extinguished. The positive pulse from terminal 986 is also applied to terminal 957 ($A_9$) of reset device 953 to produce a positive voltage at terminal 956 ($A_6$) thereof which is directly coupled to control input terminal 960 to enable gate 958 (establish one input thereof). The smaller positive pulse from the thyratron output terminal 982 coming over the line 983, also resets the decimal counters of the assembly 933 to zero. Since the decimal counters are of a conventional type such as those manufactured by the EECO Manufacturing Company, designated in the catalogue as Z10057, the operation thereof need not be described in further detail.

Since the location counting ring of the multiplexer 15 is advanced one step each time the master timer 21 supplies a negative pulse from its terminal T2, the location counting ring once during each complete cycle of operation reaches the position at which positive voltages are upon the stationary contacts upon which movable contacts 813 and 817 are resting. In consequence, when this occurs, a positive pulse passes through the positive "and" gate 871 and is applied to the inverting positive "and" gate 958. This "and" gate has been previously enabled by a positive potential on terminal 956 of the reset device 953. Accordingly, a negative pulse issuing from the terminal 961 causes the bistable device 963 to acquire a state with positive voltage on the output terminal 966. This prepares the complement-setting device 963 to accept and respond to the next negative pulse upon the terminal 965 from the terminal T12 of the master timer 21. When such a negative impulse is received from the terminal T12, the output terminal 966 is driven negative. A negative pulse is applied to terminal 955 of zero reset device 953 to place the latter in condition to respond to a negative pulse at terminal 954 at the end of the readout delay of device 991. The negative pulse at terminal 966 is shaped and sharpened by the pulse amplifier 995 which is sensitive only to negative going voltages to supply a negative pulse through the cathode follower 996 to the line 932 whereby the negative "and" gates 901 and 910 are enabled for receiving negative voltages from the output lines 911 to 920, inclusive, of the logical-circuit bistable devices 50 to 41 inclusive.

Thereupon, the radix-minus-one complement of the binary number stored in the logical circuit is set in the binary counter 879. Actually, the inverted digits of the number, which express the radix-minus-one complement thereof, are applied in parallel to terminals 891 to 900 inclusive, to accomplish this transfer into the binary counter 879. For example, if flip-flop 50 of the analog-to-digital converter is true the "1" side is at high potential which causes no output from negative "and" gate 901. Stage 881 of counter 879 will remain in the false or zero state where it has been set by the positive zero reset pulse applied at terminal 989. In false or zero state the terminals $A_6$ of flip-flops 881–890 (FIG. 2) are each relatively negative. If, on the other hand flip-flop 50 is false, its "1" side is low or relatively negative, gate 901 feeds a relatively negative pulse to terminal $A_5$ of flip-flop 881 to shift the latter from its zeroed or false state to a true state wherein terminal $A_6$ is relatively positive. Thus the state of each of flip-flops 50 through 41 is reversed into flip-flops 881 through 890 respectively. There is no carry in counter 879 upon shift from false to true (positive going output at $A_6$) since each terminal $A_4$ will respond only to negative going pulses.

The negative pulse from the pulse shaper 995 coming through the line 993 also produces a positive square wave at the output terminal of the delay device 992 so that a negative-going wave does not pass through the pulse amplifier 994 (sensitive only to negative-going potential) until the end of the square wave output of the delay device 992. This permits the zero reading to remain in the decimal counter so that the operator can observe that the apparatus is functioning properly to read zero until the end of the square wave output of the monostable device 992.

The negative-going voltage at the end of square wave from delay device 992 supplies a negative pulse through amplifier 994 and "or" gate 941 to the counter 879 so that it will be advanced one unit from the radix-minus-one complement where it has been set to the true complement value. The negative-going pulse also enters the delay device 997 to cause a positive square wave to be produced thereby. The negative trailing edge of the square wave produces a negative voltage at the output terminal 952 of the carry-enabling bistable device 946 so as to enable the negative "and" gate 973 after a sufficient time has elapsed to allow the single pulse applied through "or" gate terminal 944 to carry to the highest stage of the counter. Thus, the gate 973 is kept disabled to ensure counting of the unit advancing pulse. Since the oscillator, free-running multivibrator 971, is designed to produce negative output pulses, such negative output pulses appear in succession at the output terminal 976 of the "and" gate 973 to flow through shaper or trigger 976' to the input terminal 945 of the "or" gate 941 to cause successive advancement, unit by unit, of the binary numerical value in the counter 879 by reason of the application of such pulses to the input terminal 943 of the counter 879. The frequency of the oscillator, which may be on the order of 50 kc., is such that sufficient carry time is inherently available between successive oscillator pulses. This action continues until a negative-going voltage occurs on the output terminal 949 of the last binary storage device 890, which represents the fact that the counter 879 has been filled up to zero value. In other words, impulses have been transmitted to the decimal counter at the terminal 977 which correspond to the numerical value set in the logical circuit.

Accordingly, a negative-going voltage is capacitatively applied to the terminal 948 of the carry-enabling device 946 which is transferred as a positive voltage to the gate terminal 875 to disenable the negative "and" gate 973 and prevent the transmission of further negative pulses from the free-running oscillator 971.

At the same time, the output terminal 951 of the carry-enabling bistable device 946 is driven negative producing a positive square wave and a delayed negative-going voltage from the delay device 991. The device 991 has sufficient delay time, one second for example, to enable the decimal value which has been set in the counter 933 to be read by the operator before re-zeroing.

At the end of the output positive square wave of the delay device 991, the negative-going voltage capacitatively supplied to terminal 954 of the bistable device 953 drives the output terminal 956 positive and thus resets the apparatus to zero by again firing the thyratron 979.

At some time prior to initiation of advancement of the counters, the thyratron condenser 1012 has discharged to a point where deionization occurs and a positive potential no longer exists at reset terminals 982, 986 whereby the counters are in condition to be advanced. Thus, the condenser 1012 again charges and the thyratron is in condition to respond (by ionization) to a positive going potential on its grid which occurs at the end of the delay of device 991.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In a data processing system having a multiplexer of the multiple ring type for presenting data successively, each ring corresponding to an order of the number system used for identifying data, and having data identifying terminals, an analog-to-digital converter including a logical array with bistable electrical devices having terminals at which radix-minus-one complement voltages appear, representing data in binary form, and a master timer, a spanning monitor for selectively displaying the data in decimal form comprising in combination a bank of dial switches corresponding in number of the number of multiplexer rings, each bank having a movable contact and having stationary contacts each connected to one of the terminals of the multiplexer ring, an "and" gate connected to said movable contacts for producing a signal when multiplexer ring voltages appear simultaneously on the movable contacts, a complement set line, a plurality of data receiving "and" gates, each having a terminal connected to the set line and a second terminal, each of said second terminals being connected to a different one of the said bistable device terminals of said logical array, a digital counter comprising a plurality of binary storage devices of the bistable type, each having an input control terminal connected to one of said data receiving "and" gates for reproducing an input pulse, and a zero reset terminal, a zero readout delay device, an "or" gate having an output to said digital counter, having a first input from the zero readout delay device and a second input, a carry delay device having delay greater than the carry time of said digital counter, having an input from said zero readout delay device, a carry-enabling bistable device having an input from said carry delay device, an opposite input from the digital counter, and first and second corresponding output terminals, a data readout delay device having an input from the first output terminal of said carry-enabling bistable device, a second "and" gate having an input terminal connected to the second output terminal of said carry-enabling bistable device, having a second input terminal and having an output terminal, a free-running oscillator connected to said second input terminal, the second "or" gate input terminal being connected to said second "and" gate output terminal, a decimal counter with visual indicators, having an input terminal connected to said second "and" gate output terminal and having resetting terminals, a resetting thyratron having an output terminal connected to the resetting terminals of the counters, a third "and" gate, a complement set bistable device having an input from the master timer with a second input from the third "and" gate and having an output connected to the input of said zero readout delay device and to the set line, a zero reset bistable device having an input from the data readout delay device, and a second input from the complement set bistable device, said third "and" gate having an input from the selector dial "and" gate and an input from said zero reset bistable device, whereby said complement set bistable device sets the binary counter to a condition reproducing the radix-minus-one complement of the value represented by the bistable devices of the logical array, the "or" gate delivering an additional pulse to produce a true complement value, the free-running oscillator causing the binary counter and the decimal counter to progress successively until the binary counter is filled to zero, whereby the reading of the decimal counter represents the decimal equivalent of the value in the logical array, and the data readout delay device in conjunction with the zero readout device causes decimal values and zeros to remain in the decimal counter alternately for sufficient periods of time for visual reading.

2. In a data processing system having a multiplexer for presenting data successively, having data identifying terminals, an analog-to-digital converter including a logical array with bistable electrical devices having terminals at which radix-minus-one complement voltages appear, representing data in binary form, and a master timer, a spanning monitor for selectively displaying the data in decimal form, comprising in combination a dial switch having stationary contacts each connected to one of the terminals of the multiplexer and a selector blade cooperating with said contacts, a complement set line, a plurality of data receiving "and" gates, each having a terminal connected to the set line and a second terminal, each of said second terminals being connected to a different one of the said bistable device terminals of said logical array, a digital counter comprising a plurality of binary storage devices of the bistable type, each having an input control terminal connected to one of said data receiving "and" gates for reproducing an input pulse, and a zero reset terminal, a zero readout delay device, an "or" gate having an output to said digital counter and having a first input from the zero readout delay device and a second input, a carry delay device having delay greater than the carry time of said digital counter and having an input from said zero readout delay device, a carry-enabling bistable device having an input from said carry delay device and an opposite input from the digital counter, and first and second corresponding output terminals, a data readout delay device having an input from the first output terminal of said carry-enabling bistable device, an oscillator enabling "and" gate having an input terminal connected to the second output terminal of the said carry-enabling bistable device, having a said second input terminal and having an output terminal, a free-running oscillator connected to said second input terminal, the second "or" gate input terminal being connected to said oscillator enabling "and" gate output terminal, a decimal counter with visual indicators, having an input terminal connected to said oscillator enabling "and" gate output terminal and having resetting terminals, a resetting voltage source having an output terminal connected to the resetting terminals of the counters, a complement enabling "and" gate, a complement setting bistable device having an input from the master timer with a second input from the complement enabling "and" gate and having an output connected to the input of said zero readout delay device and to the set line, a zero reset bistable device having an input from the data readout delay device, and a second input from the complement set bistable device, said complement enabling "and" gate having an input from the selector blade, and an input from said zero bistable device whereby said complement set bistable device resets the binary counter to a condition reproducing the radix-minus-one complement of the value represented by the bistable devices of the logical array, the "or" gate delivering an additional pulse to reproduce a true complement value, the oscillator causing the binary counter and the decimal counter to progress successively until the binary counter is filled to zero, whereby the reading of the decimal counter represents the decimal equivalent of the value in the logical array, and the data readout delay device in conjunction with the zero readout device causes decimal values and zeros to remain in the decimal counter alternately for sufficient periods of time for visual reading.

3. In a data processing system including a logical array with bistable electrical devices having terminals at which radix-minus-one voltages appear, representating data in binary form, and a master timer, a spanning monitor for selectively displaying the data in decimal form, comprising in combination a complement set line, a plurality of data receiving "and" gates, each having a terminal connected to the set line and a second terminal, each of said second terminals being connected to a different one of the said bistable device terminals of said logical array, a digital counter comprising a plurality of binary storage devices of the bistable type, each having an input control terminal connected to one of said data receiving "and" gates for reproducing an input pulse, and a zero reset terminal, a complement setting bistable device having first and second opposed input terminals, an output terminal reproducing the input of a second input terminal, an "or" gate having an output to said digital counter having a first input from the complement setting bistable device and a second input, a carry delay device having delay time greater than the carry time of said digital counter, having an input from said complement set device, a carry-enabling bistable device having an input from said carry delay device, an opposite input from the digital counter and first and second corresponding output terminals, an oscillator enabling "and" gate having an input terminal connected to the second output terminal of the said carry-enabling bistable device, having a second input terminal and having an output terminal, a free-running oscillator connected to said second input terminal, the second "or" gate input terminal being connected to the output terminal of said oscillator enabling "and" gate, a decimal counter having an input terminal connected to said oscillator enabling "and" gate output terminal and having resetting terminals, a resetting voltage source having an output terminal connected to the resetting terminals of the counters, a complement enabling "and" gate, the complement setting bistable device having an input from the master timer with a second input from the complement enabling "and" gate, the set line being connected to the output of said complement setting bistable device, a zero resetting bistable device having an input from the carry-enabling bistable device and a second input from the complement seting bistable device, said complement enabling "and" gate having an actuating input and an input from the carry-enabling delay device, whereby said complement setting bistable device sets the binary counter to a condition reproducing the radix-minus-one complement, representing the value of the bistable devices of the logical array, the "or" gate delivering an additional pulse to reproduce a true complement value, the oscillator causing the binary counter and the decimal counter to progress successively until the binary counter is filled to zero, whereby the reading of the decimal counter represents the decimal equivalent of the value in the logical array.

4. In a data processing system having a multiplexer of the multiple ring type for presenting data successively, each ring corresponding to an order of the number system used for identifying data and having data identifying terminals, an analog-to-digital converter including a logical array with bistable electrical devices having terminals at which radix-minus-one complement voltages appear, representing data in binary form, and a master timer, a spanning monitor for selectively displaying the data in decimal form comprising in combination a bank of dial switches corresponding in number to the number of multiplexer rings, each bank having a movable contact and having stationary contacts each connected to one of the terminals of the multiplexer ring, an "and" gate connected to said movable contacts for reproducing a signal when multiplexer ring voltages appear simultaneously on the movable contacts, a digital counter comprising a plurality of binary storage devices of the bistable type, means responsive to the output of said "and" gate for causing a complement of the number in the logical array to appear in the digital counter, a decimal counter, and means for progressing both counters until the digital counter has been filled to zero whereby the reading of the decimal counter represents the decimal equivalent of the value in the logical array.

5. A spanning monitor for a data processing system comprising in combination with a multiplexer for successively presenting data from a plurality of channels and a logical circuit for converting the presented data into digital form, a digital counter connected to the logical circuit with means for entering therein the digital form value from the logical circuit, a decimal counter, means for selecting a multiplexer channel, and means responsive to presentation of such channel to the logical circuit for advancing both counters by the amount of the value in the logical circuit for advancing both counters by the amount of the value in the logical circuit for enabling the decimal value of the data from such multiplexer channel to be read.

6. A spanning monitor for a data processing system comprising in combination with a logical circuit for converting data into digital form for processing in a computer, a digital counter connected to the logical circuit with means for entering therein the complement of the digital form value from the logical circuit, a decimal counter, and means for advancing both counters by the complement of the amount of the value in the digital counter for enabling the decimal value of the data to be read.

7. Apparatus for indicating a number expressed in a predetermined number of orders stored in a storage device comprising means for inverting each digit of said stored number to obtain the radix-minus-one complement of said stored number, means for adding one unit to said radix-minus-one complement to obtain the true complement of said stored number expressed in said predetermined number of orders, means for adding to said true complement a number of units sufficient to zero each order of said stored complement, means for indicating the total of said added units, timing means for repetitively recycling each of said means, and delay means for effecting a predetermined delay at the end of each recycling to facilitate utilization of said indicating means.

8. Digital readout apparatus comprising a number storing device; a counter; means responsive to said device for setting into said counter the complement of a number stored in said device; pulse means for advancing said counter to zero; means for indicating the number of pulses required to advance said counter to zero; means for zeroing said counter and said indicating means; timing means for repetitively initiating operation of each of said complement setting means, said pulse means, said indicating means and said zeroing means; and delay means for delaying the operation of said zeroing means for a fixed time interval immediately prior to each said initiation of operation of said timing means.

9. In combination with an analog-to-digital converter for converting and storing an analog input in digital form, a multiplexer having a channel selector for sequentially feeding input data on a plurality of channels to said converter, a digital counter, means for setting into said counter the complement of the number stored in digital form in said converter, means responsive to said channel selector for actuating said setting means when the data from a predetermined input channel is stored in said converter, means for advancing said counter to zero by a succession of incremental changes of predetermined digital value, and means for indicating the total value of said incremental changes.

10. Digital readout apparatus comprising a number storing device having a plurality of stages, each of which stores one digit of a number to be indicated, means for inverting the digit of each of said stages, a counter having a number of stages equal to the number of stages of said storing device, means for setting said inverted digits into corresponding counter stages, a timer, means responsive to said timer for effecting a unit advance of said counter, a pulse generator, means responsive to said timer for coupling said generator to said counter to repetitively pulse said counter for further advancement thereof, output means for counting the pulses coupled to effect said further advancement, and means responsive to a predetermined condition of at least one of said counter stages for stopping the counting of said pulses by said output means.

11. Apparatus of the class described comprising an analog-to-digital converter for converting an input presented thereto into digital form, a multiplexer for sequentially feeding a plurality of inputs to said converter and including location means for generating a signal identifying each input fed to said converter, selection means responsive to said identifying signal for generating a readout signal when a selected input is fed to said converter, a readout counter, zero reset means including delay means responsive to said readout signal for zeroing said counter for a predetermined time interval, means responsive to said delay means and said converter for advancing said readout counter in accordance with the value of the digital form of said selected input in said converter, timing means for repetitively recycling said apparatus, and readout delay means for maintaining said readout counter as advanced in accordance with said value for a predetermined time interval prior to each recycled zeroing.

12. Apparatus of the class described comprising an analog-to-digital converter for converting an input presented thereto into digital form, a multiplexer for sequentially feeding a plurality of inputs to said converter and including location means for generating a signal identifying each input fed to said converter, a complement set gate, selection means responsive to said identifying signal for enabling said gate when a selected input is fed to said converter, means for supplying a synchronizing signal to said gate, a readout counter, zero reset means including delay means responsive to said synchronizing signal fed through said gate for zeroing said counter for a predetermined time interval, means responsive to said delay means and said converter for advancing said readout counter in accordance with the value of the digital form of said selected input in said converter, means responsive to said advancing means for actuating said zero reset means, and readout delay means for maintaining said readout counter as advanced in accordance with said value for a predetermined time interval immediately prior to actuation of said zero reset means by said advancing means.

13. Digital readout apparatus comprising storage means for storing numbers, a counter, selector means for choosing a number in said storage means to be read out, means responsive to the selector means for setting into the counter the complement of a number in said storage means to be read out, a zero readout delay device responsive to the selector means for providing a single pulse to the counter, a pulse generator, an output device, a pulse enable gate for transmitting pulses from the pulse generator to said counter and to said output device, means responsive to said delay device for enabling said gate, and means responsive to zeroing of said counter for disabling said gate.

References Cited in the file of this patent

UNITED STATES PATENTS

| | | |
|---|---|---|
| 2,680,240 | Greenfield | June 1, 1954 |
| 2,761,620 | Lindesmith | Sept. 4, 1956 |
| 2,853,235 | Brinster et al. | Sept. 23, 1958 |
| 2,954,166 | Eckdahl | Sept. 27, 1960 |